July 21, 1953  G. D. GOODNER  2,646,126
WELL SCREEN
Filed Aug. 18, 1950
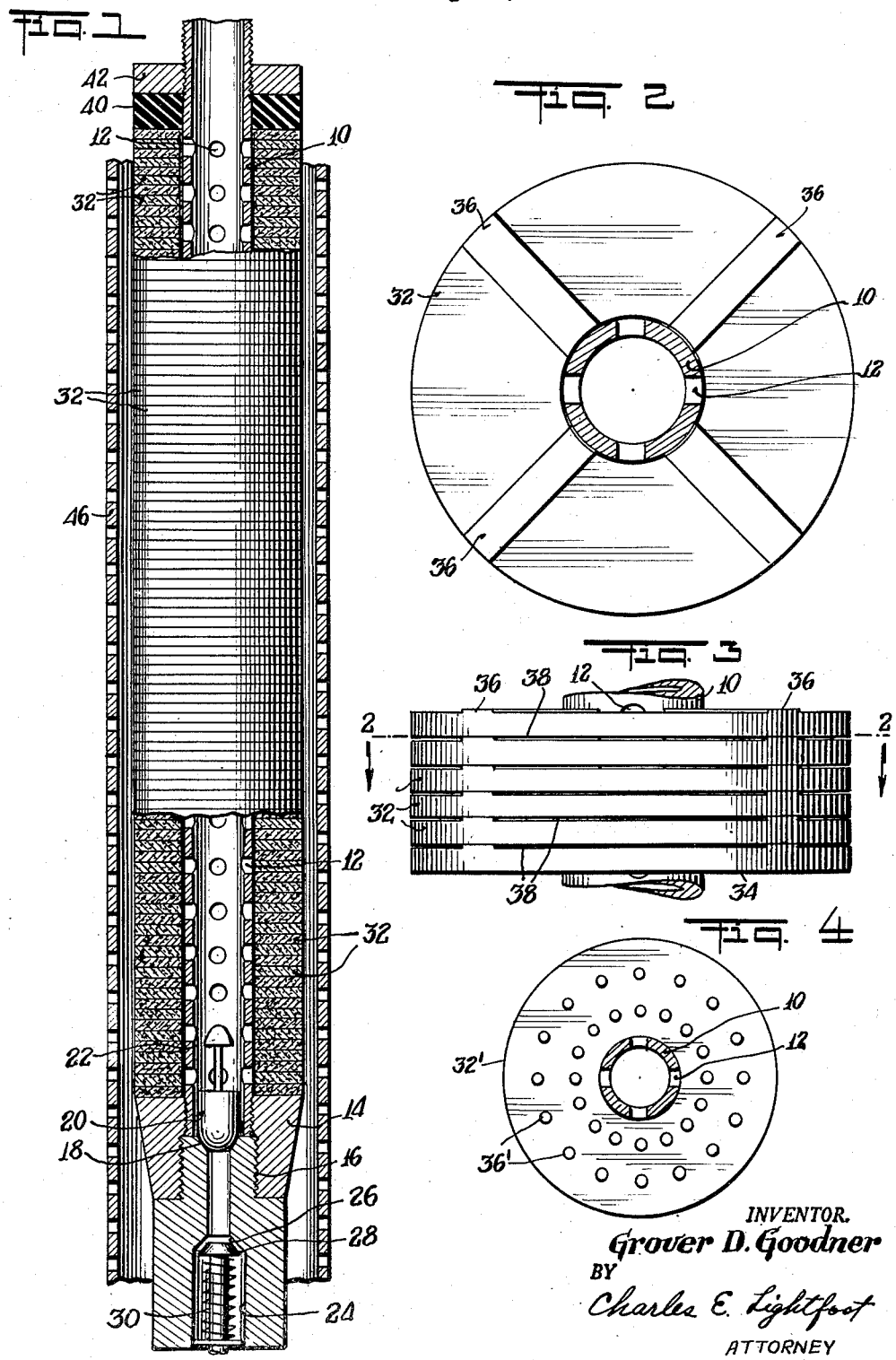
INVENTOR.
Grover D. Goodner
BY
Charles E. Lightfoot
ATTORNEY Patented July 21, 1953

2,646,126

UNITED STATES PATENT OFFICE 2,646,126

WELL SCREEN

Grover D. Goodner, Houston, Tex.

Application August 18, 1950, Serial No. 180,240

3 Claims. (Cl. 166—5)

This invention relates to well screens and more particularly to a screen structure adapted for use in oil wells to permit the removal of oil from unconsolidated formations while excluding sand or other particles from the oil.

One of the chief problems encountered in the production of oil from unconsolidated formations, such as sand or the like in oil wells, is the provision of means for excluding sand or other fine particles from the producing string. This problem has been found particularly difficult where the well is being produced under pressure, making it unnecessary to employ a choke in the producing string, which may easily become stopped up by small particles of foreign matter in the oil.

For the purpose of excluding such particles from the producing string it is customary to employ well screens of various kinds, the most common type of screen being one which is formed of two concentrically arranged tubes, one of the same diameter as the producing string and another of larger diameter. Both of these tubes are perforated with holes or slits to allow the passage of fluid therethrough from the well, and the annulus between the tubes is packed with a suitable material such as fine gravel, permeable plastic or glass beads.

Such screens as heretofore constructed have had the disadvantage of being subject to rapid abrasion or cutting by the jetting action of sand laden fluid from the well formation, when used in wells producing under pressure. Another disadvantage to which such screens are subject is the rapid coating or clogging of the screen with mud or similar material from the well, which may not be readily removed, and which eventually results in stopping the flow of fluid through the screen.

When a well screen of conventional construction is used in a well in which the casing has been perforated opposite a sandy formation, and the pressure of the fluid is high, jetting action may take place through the perforated casing, causing rapid abrasion of the screen until a large opening is produced, resulting in the passage of particles of sufficient size to close the bore of the choke being used, or to cause other damage in the well equipment.

The frequent removal of well screens for purposes of repair or replacement has in the past formed a large item of expense in the operation of oil wells, and although many different materials and types of screens have been proposed these have met with only partial success in solving the difficulties mentioned.

It is the principal object of the present invention, therefore, to provide a well screen which is capable of indefinitely withstanding the abrasive action produced by the jetting of fluid from unconsolidated well formations.

A further object of the invention is the provision of a well screen which can be readily cleaned when coated with mud or other such material to an extent which substantially interferes with efficient operation of the screen.

Another object of the invention is to provide a well screen structure which is relatively unaffected by acids or other conditions of the well fluid which deleteriously effect screens of conventional materials.

A further object of the invention is the provision of a well screen which can be readily assembled or taken apart and which is easily replaceable when worn or damaged.

A further object of the invention is to provide a well screen made up of a plurality of identical units of corrosion and abrasion resistant material, and means for assembling the same to form a compact, strong and efficient screen structure.

A still further object of the invention is to provide a well screen of simple design and rugged construction capable of withstanding the extreme conditions of use to which such a device is customarily subjected.

The invention may best be understood from the following description, constituting a specification of the same, when taken in conjunction with the annexed drawings, wherein—

Figure 1 is a side elevational view, partly in cross-section, showing the invention in position for operation in a well;

Figure 2 is a horizontal cross-sectional view taken along the line 2—2 of Figure 3;

Figure 3 is a fragmentary side elevational view, showing the relationship of the screen units in the assembled condition of the screen; and, Figure 4 is a cross-sectional view similar to Figure 2, showing a somewhat modified form of screen unit.

Referring now to the drawings in greater detail, the well screen has a perforated core pipe 10 provided with openings 12, which may be of any desired shape and size. The openings are preferably distributed evenly throughout the area of the core, except at its upper and lower extremeties where it is externally threaded.

At its upper end the core 10 may be coupled to the producing string of pipe, not shown, in any convenient manner, and at the lower end the core has a bottom flange member of nut 14 threaded thereon. The flange member 14 may be formed with a somewhat enlarged internally threaded bore 16, into which a bottom hole valve of conventional design is threaded. This bottom hole valve is provided with an upper valve seat 18 for the reception of a retrievable ball or plug valve 20, having a head 22 or other suitable means for its recovery. The bottom hole valve is also formed with an enlarged bore portion 24 at its lower end, terminating in a lower valve seat 26, and a spring pressed valve 28 is supported in any convenient manner in the bore 24 and is urged into seating engagement with the lower valve seat by a coil spring 30.

About the core pipe 10 and supported on the flange member 14 there are a number of substantially identical screen members or discs 32 of circular formation, each having a central opening 33 through which the core pipe passes. The opening 33 is sufficiently large to permit the members to be readily placed over the bore in superposed relation.

The screen members or units 32 are formed of suitable corrosion and abrasion resistant material, such as ceramics, and the like, but may be made of any material having the requisite physical properties. The units are preferably but not necessarily of the shape indicated in Figure 2, each unit being substantially flat on one side as indicated at 34 and having projections or ribs 36 on the other side. Such projections or ribs 36 may be of any desired thickness, depending upon the size of particles which are to be excluded by the screen and the conditions under which the same is to be used.

In assembling the screen the units are placed on the core with the ribs 36 of one unit engaging the flat surface of the succeeding unit, so that all the ribs extend in the same direction, thus spacing the discs the same distance apart and providing screen openings or passageways 38 of uniform size throughout the entire screen.

In order to retain the screen units in compactly assembled condition on the core, a resilient member 40 may be disposed on the core on top of the topmost unit, and an internally threaded flange or nut 42 is threaded on the upper end of the core to hold the screen assembled.

In Figure 4 there is shown a slightly modified form of screen unit 32', wherein projections 36' are distributed over one side of each screen unit instead of the ribs 36 and which unit has a central opening 33' therethrough. In other respects the unit 32' is similar to the unit 32 previously described.

The assembled well screen may be inserted in a well casing, indicated at 46, attached to the producing string and the fluid from the well pumped or otherwise passed through the screen into the core pipe 10 and thence upwardly through the string.

It will be apparent that, when the screen constructed as described above, is subject to sand bearing fluid under high pressure, such as might escape from an unconsolidated formation surrounding a perforated portion of the casing, the abrasive action caused by jetting of the fluid, such abrasion must cut through a relatively great thickness of the screen units before any enlargement of the screen openings or passageways will result. Thus, by making the units of hard, abrasion resisting material, such as ceramics, the life of the screen may be indefinitely extended. Moreover, in the event of clogging of the screen due to the formation of an adherent coating of mud or the like over the outside of the screen, such material may be readily removed by forcing fluid out through the screen from the core pipe, or by treating the well with suitable agents to remove the coating which might otherwise damage a conventional well screen. When it is desired to so treat the screen to unclog the same the valve 20 is dropped into the producing string to seat on the valve seat 18, so that fluid passing down through the core will be forced out through the screen openings. The valve 20 may be recovered in the usual way when the screen cleaning operation has been completed.

It will thus be seen that the invention provides a well screen of simple design, which is relatively indestructible and in which a large capacity for the passage of fluid is obtained without a corresponding increase in the size of particles which may pass through the screen.

While the invention has been disclosed in connection with a specific embodiment of the same, it will be understood that this is intended by way of illustration only, and that numerous changes can be made in the construction and arrangement of the various parts, without departing from the spirit of the invention, or the scope of the appended claims.

Having thus clearly shown and described the invention, what is claimed as new and desired to secure by Letters Patent is:

1. A well screen comprising, a perforated tubular core, flange means secured to each end of the core, a plurality of disc-shaped members arranged in superposed relation on the core between the flange means, portions of said members being spaced apart to form radially outwardly flaring passageways between the members, and yieldable means around the core and cooperable with said members and flange means to exert pressure on said members longitudinally of the core.

2. A well screen comprising, a perforated tubular core, flange means secured to each end of the core, a plurality of disc-shaped members arranged in superposed relation on the core, resilient means on the core between the flange means and cooperable with said members and said flange means to exert pressure on said members longitudinally of said core, portions of the members being spaced apart to form passageways having radially inwardly converging side walls between the members.

3. A well screen comprising a perforated tubular core, flange means secured to each end of the core, a plurality of disc-shaped members arranged in superposed relation on the core between the flange means, portions of said members being spaced apart to form radially outwardly flaring passageways between the members, resilient means on the core between the flange means, in position to transmit a compressive force from said flange means to said members, one of said flange means being movable on said core to vary said compressive force.

GROVER D. GOODNER.

References Cited in the file of this patent

UNITED STATES PATENTS

| Number | Name | Date |
|---|---|---|
| 1,061,928 | Seavey | May 13, 1913 |
| 1,218,848 | Foster | Mar. 13, 1917 |
| 1,588,920 | Trahan et al. | June 15, 1926 |
| 1,642,864 | Williams | Sept. 20, 1927 |
| 1,645,719 | Paulsen | Oct. 18, 1927 |
| 1,646,404 | Herbert | Oct. 25, 1927 |
| 1,688,326 | Boulade | Oct. 23, 1928 |
| 1,771,928 | Jung | July 29, 1930 |
| 1,995,850 | Harter | Mar. 26, 1935 |
| 2,164,195 | Waltermire | June 27, 1939 |
| 2,322,772 | Pennebaker | June 29, 1943 |

FOREIGN PATENTS

| Number | Country | Date |
|---|---|---|
| 226,274 | Great Britain | Dec. 18, 1924 |